June 3, 1952  J. C. RAMEY  2,598,831
MEANS FOR PROVIDING AN OBJECT WITH WHEELS AND AXLES
Filed July 14, 1950

John C. Ramey
INVENTOR.

BY *Clarence A. O'Brien*
*and Harvey B. Jacobson*
Attorneys

Patented June 3, 1952

2,598,831

UNITED STATES PATENT OFFICE 2,598,831

MEANS FOR PROVIDING AN OBJECT WITH WHEELS AND AXLES

John C. Ramey, Waynesburg, Ky.

Application July 14, 1950, Serial No. 173,880

4 Claims. (Cl. 280—35)

This invention comprises novel and useful improvements in wheeled attachments and more particularly pertains to a device for detachably providing an object with wheels.

An important object of this invention is to provide a wheeled attachment for receptacles and platforms of various types so that the latter may readily be converted into carts and trailers and the like.

Another object of this invention is to provide a wheeled attachment in accordance with the foregoing object, which attachment will positively and firmly, yet detachably, clamp a body thereto in such a manner as to prevent relative movement of the attachment and the body.

A further object of this invention is to provide a wheeled attachment, in accordance with the foregoing objects, which attachment is of simple construction, yet durable and highly efficient for the purposes intended.

An important feature of this invention resides in the provision of a wheeled attachment which consists of a pair of shafts, with clamp means mounted on each shaft for engaging a body, and means for positively urging the shafts and clamps toward each other so that the clamps will be embedded in the body, and thereby firmly retaining the attachment and the body together.

Another feature of this invention resides in the provision of an attachment, in accordance with the foregoing feature, in which the upper leg is adapted to be embedded in the body, while the lower leg underlies the body to prevent relative movement of the shaft and body.

These, together with various ancillary objects and features, are attained by this device, the preferred embodiment of which has been illustrated by way of example only in the accompanying drawings, wherein.

Figure 1:
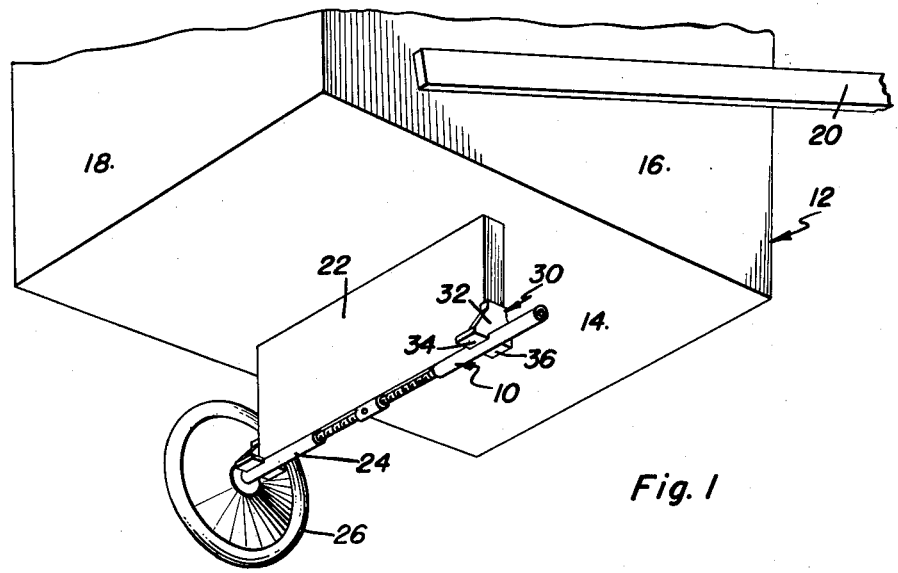
Figure 1 is a fragmentary perspective elevational view of a cart with the wheeled attachment mounted thereon.
Figure 2:
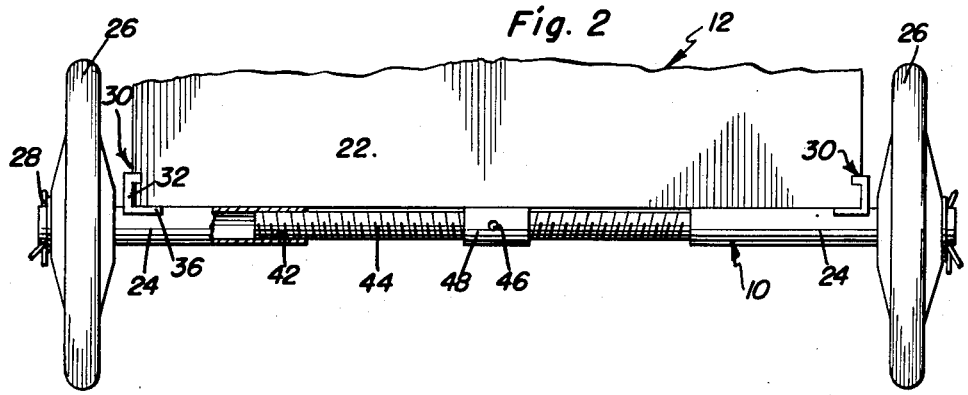
Figure 2 is a fragmentary rear elevational view showing the manner in which the wheeled attachment is mounted upon a car.

Referring now more specifically to the accompanying drawings, wherein like numerals designate similar parts throughout the various views, it will be seen that there is provided a wheeled attachment, indicated generally by the numeral 10 which is adapted to be detachably secured to an object indicated generally by the numeral 12 to provide the latter with wheels.

It is well known that children often attempt to construct carts and trailers with boxes and platforms, such as they have available, in order to utilize their otherwise latent constructive ability, but that their work is often impeded by the limited tools with which they have to work, and further limited by the unavailability of an inexpensive wheeled attachment for the boxes and platforms.

It is accordingly, a desideratum of this invention to provide a wheeled attachment which is of inexpensive construction, and of simple operation, so that children may effectively utilize the same.

The object 12 may be of any construction, and may conveniently comprise a platform 14 having upwardly extending side walls 16 and end walls 18, a suitable handle 20 being attached to the object 12 in any desired manner. The object 12 may also be provided with a depending beam 22, to which the wheeled attachment 10 may be attached, or alternatively the wheeled attachment may be mounted directly upon the object 12.

The wheeled attachment 10 consists generally of a pair of axle forming members 24, upon which are rotatably journaled a pair of wheels 26, which wheels are retained upon the shaft by means of cotter pins 28 or the like. It is now apparent that runners (not shown) may be substituted for the wheels 26, without departing from the spirit of this invention.

Figure 3:
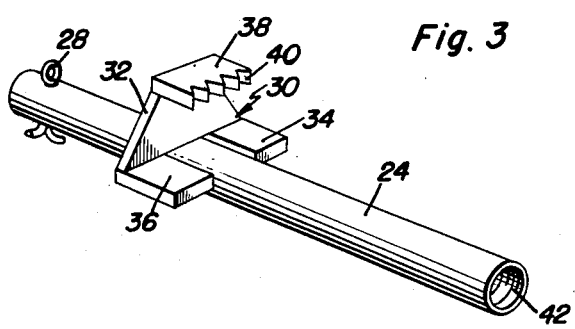
Figure 3 is a perspective elevational view of one of the shaft forming members, with the clamp means mounted thereon.

A pair of object engaging clamps 30 are rigidly secured to each of the shafts 24, in order to firmly retain the shafts and the object in engagement with each other. These clamps 30 include a web portion 32, to which is attached a pair of transversely extending laterally spaced leg members 34 and 36. As is best shown in Figure 3 of the drawings, the shaft 24 is secured between the transversely extending leg portions 34 and 36, the upper surface of the shaft lying substantially co-planar with the inner surface of the lower leg portions 34 and 36. An upper leg 38 is mounted upon the other edge of the web portion 32, in registry with the lower leg portions 34 and 36, which upper leg is serrated as at 40 in order that it may be firmly embedded into a body, such as the beam 22 on the object 12.

In this manner, it will be seen that there is provided a clamping means in which the lower legs will underlie the lower edge of a body, the web portions embracing the side of the body, while the upper leg 38 is firmly embedded in the body, whereby relative movement of the axle and the body is prohibited. Additionally, it will be seen that the web portion 32 of the clamp 30 may also serve to limit the inward axial movement of the wheel 26 of the shafts 24.

In order to positively urge the shafts 24, and consequently the clamps 30 into and out of engagement with a body, it is intended that the shafts be each internally screw threaded as at 42, the threads in one of the shafts being inverse the threads in the other of the shafts so that a correspondingly externally threaded rod 44 may be selectively rotated to positively urge the shafts toward or away from each other.

Any convenient means may be provided for rotating the rod 44, one satisfactory method being to provide a transverse bore 46 in the rod 44, which bore will detachably receive an actuating pin which may be utilized to rotate the rod, in an obvious manner. Additionally, the rod 44 may be provided with an enlarged portion 48 adjacent the bore 46, which enlarged portion is substantially equal to the diameter of the shaft 24, the enlarged portion thus underlying and abutting the underside of the body, such as the beam 22, to prevent lateral displacement of the rod as the later is being rotated.

From the foregoing, it is thought that the operation and construction of the device will be readily understood, and further discussion is therefore believed to be unnecessary. However, numerous modifications will readily occur to those skilled in the art after a consideration of the foregoing specificataion and accompanying drawings, it is not intended to limit the invention to that shown and described, but all suitable modifications may be resorted to falling within the scope of the appended claims.

Having described the invention, what is claimed as new is:

1. A wheeled attachment comprising a pair of tubular axle forming members, a first of said axle members having internal screw threads in one end thereof, a bolt threadedly received in said first axle member and rotatably attached to the second axle member, a wheel rotatably journaled on each of said axle members, a U-shaped clamp carried by each of said members, each clamp having upper and lower legs and a connecting web portion, said lower leg being secured transversely of its coacting axle members, said webs limiting inward axial movement of said wheels on said axle members, said upper legs extending inwardly to engage a body positioned between said clamps when said bolt is rotated to advance said axle members towards each other.

2. The combination of claim 1, wherein said upper leg is serrated.

3. A wheeled vehicle comprising a body having side walls and a bottom wall, a pair of shafts, means longitudinally adjustably securing said shafts to each other, a ground engaging member rotatably journaled on each of said shafts, a pair of U-shaped clamps having upper and lower legs and a connecting web portion, said upper leg being embedded in said body and locked in said embedded position by said shaft adjusting means, said lower leg underlying said body to prevent relative movement of the axle and the body, said web portion limiting inward axial movement of said ground engaging member.

4. A readily applicable and removable attachment adapted to enable a juvenile to readily construct a "soap-box" vehicle with the aid of a commodity box flat platform or the like comprising a turnbuckle embodying a pair of axially aligned longitudinally spaced tubular axle forming members having their opposed inner ends internally screw-threaded, and a bolt having threaded end portions screwed into the coacting end portions of said tubular members and operatively coupling the latter together, a clamp rigidly mounted on the outer end portion of each of members, each clamp having a vertical portion and an upper laterally directed toothed portion constituting a jaw, said jaws being adapted to be embedded in the coacting box walls when said turnbuckle is tightened up, said clamps having the additional function of wheel position establishing shoulders and functioning to limit the distance of movement of the wheels in directions toward each other, and means removably mounting the wheels on said members outwardly of said clamps.

JOHN C. RAMEY.

REFERENCES CITED

The following references are of record in the file of this patent:

UNITED STATES PATENTS

| Number | Name | Date |
|---|---|---|
| 43,488 | Gallagher | July 12, 1864 |
| 1,642,502 | Krasberg | Sept. 13, 1927 |
| 1,707,186 | Chatfield | Mar. 26, 1929 |
| 2,332,443 | Foringer | Oct. 19, 1943 |

FOREIGN PATENTS

| Number | Country | Date |
|---|---|---|
| 9,021 | Great Britain | Nov. 25, 1899 |